United States Patent Office 2,816,016
Patented Dec. 10, 1957

2,816,016

PELLETIZING IRON ORE CONCENTRATES

Fred D. De Vaney, Hibbing, Minn., assignor to Erie Mining Company, Hibbing, Minn., a corporation of Minnesota No Drawing. Application June 11, 1956,
Serial No. 590,358

2 Claims. (Cl. 75—5)

This invention relates to the art of "pelletizing" initially moist, finely divided iron ore, e. g., iron ore concentrates, and similar finely divided mineral solids.

By the term "pelletizing" is here meant the combination of steps comprising (a) forming the moist particles into small balls or "pellets" containing a solid exothermically oxidizable component and delivering the same to the stockline of a column of similar pellets occupying and gravitationally descending through a generally vertical, shaft-type, indurating furnace chamber, and (b) therein indurating the pellets—in such manner that the pellets remain substantially discrete—at an elevated temperature approaching or substantially equal to the fusion temperature of the particulate starting material whereby to render the pellets hard, mechanically rugged and able to withstand—with minimum breakage and abrasion losses—the severely rough handling incident to shipment from the mining areas to lower lake port consumers (blast furnaces).

The present invention is particularly concerned with the second, or indurating, step, and more especially with improvements in the induration of initially moist pellets of magnetite.

The problem of economically, yet satisfactorily, pelletizing iron ore concentrates has been the subject of very extensive investigation, and many specifically different procedures have been proposed.

It heretofore had been proposed to heat-harden such iron ore pellets at temperatures well below the fusion temperature of the particulate starting material, and to provide the total heat necessary for the desired induration by the oxidation (combustion) of a solid exothermically oxidizable component (e. g., solid carbonaceous fuel) of the pellets, only incidentally and occasionally supplementing such heat input—for the purpose of "controlling" the operation—by the flameless combustion (in the interstices between the pellets of the pellets column occupying the furnace) of a very small amount of gaseous fuel (e. g., methane) in a relatively large amount of air being forced countercurrently through the pellets column descending through the furnace. However, the proponents of this procedure found that the same not only required an excessive amount of fuel (e. g., about 1,000,000 B. t. u.'s per short ton of furnace feed, dry basis) but, more importantly, also failed properly to control the induration. It was found, also, that effecting induration at a temperature well below the fusion temperature failed to render the product sufficiently rugged to withstand extensive shipment without intolerable breakage and abrasion losses.

It had been proposed to indurate pellets of moist iron ore particles by a procedure according to which the pellets were formed from a composition containing a small amount (e. g., 30 pounds, more or less, per long ton of feed) of an exothermically oxidizable component (e. g., finely divided coal or coke), and a stream of air—initially, at substantially ambient air temperature—was forced into the bottom of the gravitationally descending pellets column and countercurrently through the latter to a level therein intermediate the bottom and top of the column, at which point a substantial part of the air—then in preheated state by reason of heat transfer thereto from the contacted indurated pellets—was diverted from the pellets column to a spatially separate combustion chamber wherein the diverted portion was further heated by the combustion therein of a carbonaceous fuel to a temperature of about 1800–2000° F., whereupon the resulting heated gases (air plus gaseous combustion products) were passed from the combustion chamber into the pellets column, at a level above the level of diversion but below the top of the column, and therein mingled with the non-diverted portion of the air stream and with the latter passed countercurrently through the remainder of the pellets column. According to this procedure the heat derived by the burning of fuel in the combustion chamber was so proportioned to the heat derived by the oxidation of the exothermically oxidizable component of the pellets composition that the pellets were heated—in a relatively shallow zone (not more than 24 inches in thickness, and often less) lying some 12–18 inches beneath the stockline (herein referred to as "peak temperature zone") to a peak temperature (about 2400° F., more or less) at which incipient fusion occurred within the interiors of the pellets. Thereby, the pellets were more or less indurated.

The procedure described above had undesirable characteristics or features. Thus, in any large-scale operation of the process, involving the maintenance of a column of pellets many feet wide, it is difficult if not impossible entirely to prevent non-uniformity in the gas-permeability of the pellets column, inevitably resulting in non-uniform flow of the heating gas through the column. When such non-uniform flow occurred in the aforesaid relatively very shallow "peak temperature zone" the frequent result was that those pellets which, in their gravitational descent through said zone, were in spaces (parts of the column) where the arrangement of solids was such that insufficient flow of hot gases therethrough occurred, passed out of said zone without having been heated sufficiently to develop the desired extent of induration, whereas other pellets, located in spaces (parts of the column) which were more permeable, were thoroughly heated and, hence, desirably indurated. The insufficiently indurated pellets were undesirably "soft" (i. e., abraded too readily during shipment). Moreover, the magnetite content of such pellets was (because of insufficient oxidation) only partially converted to hematite. Faced with such practically inescapable non-uniformity in gas flow, the operator attempted to counteract its undesirable results by incorporating relatively large amounts (30 pounds and above) of the finely divided solid carbonaceous fuel in the composition from which the pellets were formed. While larger amounts of fuel led to development of higher "peak temperatures," this expedient did not strike to the real cause of non-uniform induration and did not cure the latter. Moreover, use of relatively large amounts of solid fuel caused the development of "chunks" or gross fused-together aggregates which hindered uniform descent of the column through the lower part of the furnace shaft. Moreover, the more solid fuel there was used the lower became the density of the indurated product, since 30 pounds of coal occupies the space of about 120 pounds of magnetite. It was found to be a practical impossibility, in the above-described operation, to proceed by the theoretically alternative procedure of maintaining the coal content at a low level and counterbalancing this decrease in B. t. u.'s by correspondingly increasing the combustion chamber temperature above the 1800°–2000° F. range, because of the following circumstance. A significant amount of dust is created in the gravitational descent of the pellets column, which dust is air-transportable and is carried by the diverted air stream out of the furnace chamber and into the combustion chamber. If, then, enough fuel is burned in this dust-laden stream of preheated air to raise the temperature of the latter above about 1800°–2000° F., the air-borne dust becomes a fluid or semi-fluid slag which adheres to the combustion chamber walls, the burner, and the inner surfaces of the combustion chamber ports thereby effectually "plugging up" the combustion chamber and necessitating frequent shut-downs. In the face of this very critical situation, it is possible in actual practice to elevate the combustion chamber temperature above the 1800°–2000° F. range only by using ambient (substantially dust-free) air as the combustion air for the combustion chamber.

It has been found that for a desirable extent of induration actual grain growth—as between iron oxide particles—is an absolute necessity. It has been found, moreover, that adequate grain growth necessitates not merely high temperature heating but rather high temperature heating over an extended period of time, grain growth being a time-consuming phenomenon. It was found, in the above-described conventional process, that in the brief interval of time required for a pellet to descend—in the column—through a shallow (2 foot, or less) zone of "peak temperature" only those pellets which had occupied spaces where gas flow had been normal-to-high had been held at optimum high temperature long enough to permit the desired grain growth.

The present process of indurating pellets of finely divided magnetite concentrates insures the heat-treatment of the pellets at a sufficiently high temperature sustained over a sufficiently extended period of time to develop a desirable (and fully adequate) extent of actual grain growth between iron oxide particles to meet the severest criteria as to hardness and ruggedness of indurated product. This is not a matter of attaining a significantly higher peak temperature than heretofore, but rather of maintaining the high peak temperature over a substantially longer time interval than heretofore contemplated. These goals are met by the combination of measures (a) using a lower than conventional coal (or coke) content within the pellets, (b) using a substantially higher than conventional heating gas temperature, (c) properly proportioning the amount of cooling air (introduced adjacent the bottom of the column of pellets) to the amount of high-temperature heating gas, and (d) maintaining the pellets at peak temperature for a longer time interval than conventional.

More specifically, I limit the solid fuel content of the pellets within the range 0.25%–1.25%, preferably, to about 0.50%–0.75% by weight; and increase the temperature of the heating gas substantially above 2000° F. and preferably in a range 2300°–2550° F. (measured as it passes through the ports communicating between the spatially separate combustion chamber and the furnace shaft), in which grain growth obtains; and I split the total air 70–55% directed to bottom cooling, and 30–45% directed to the combustion chamber; and hold the pellets at grain growth temperature for a period of at least 40 minutes, e. g., for approximately 4 times as long as heretofore, as by (a) materially extending the height of the zone of grain growth temperature (e. g., from about 2 feet, as heretofore conventional, to about 8 feet), the rate of descent of the column being a constant, or (b) materially reducing the rate of descent of the column, or (c) a combination of these measures.

The results of this combination of modified conditions are distinctly surprising to one skilled in this art. The proportion of insufficiently hard pellets in the final product is negligible. The pellets shrink in size, becoming denser than before. The magnetite is more completely oxidized to hematite.

The invention will now be described with greater particularity with reference to the following specific example:

*Example*

The starting material was magnetite concentrate having a fusion temperature of about 2650° F. and an analysis of

| | |
|---|---|
| Fe | 63.5 |
| $SiO_2$ | 9.07 |
| Mn | 0.20 |
| $Al_2O_3$ | 0.15 |
| CaO | 0.15 |
| MgO | 0.25 |
| P | 0.015 |

The particle size was substantially all finer than 65 mesh, with 70% finer than 325 mesh. The concentrate was in the form of a filter cake containing 10.2% moisture.

To this moist concentrate filter cake there were added the following "additives," the recited amounts relating to 1 long ton, dry weight, of feed:

| | Pounds |
|---|---|
| Anthracite (finely divided) | 18.4 |
| Bentonite | 15.6 |
| Soda ash | 1.4 | and these ingredients were thoroughly mixed, as by mulling, until the composition was reasonably homogeneous. The homogeneous mix was formed into pellets by means of a balling drum, the green pellets varying in size within the diameter range of 0.67–1.2 inches.

The furnace employed for the induration of the pellets was a vertical shaft furnace, and the upper and middle portions of the furnace chamber were rectangular in cross-section with a cross-sectional area of 84 square feet. The height of the shaft from the inlet ports (for leading hot gases from the combustion chamber into the furnace chamber) to the normal stockline of the pellets column was 8 feet. Beneath the inlet ports the furnace chamber extended, as a straight shaft, for about 22 feet, at which level the shaft divided into two, tapering, discharge legs each having a height of about 19 feet.

The green (i. e., initially moist, unindurated) pellets were delivered, onto the stockline of a column of similar pellets filling the furnace chamber, at a rate corresponding to 28.5 long tons, dry basis, per hour, i. e., at a rate of 760 pounds per square foot of cross-sectional area per hour, and the height of the column was maintained substantially constant by removing indurated pellets from the bottom of the column at a corresponding rate. At this rate of throughput a pellet was resident in that portion of the column extending above the inlet ports for about 87 minutes. Air, in a total amount of 0.85 pound per each 1 pound of dry feed, was forced under pressure into the bottom portion of the pellets column and into a combustion chamber spatially separate from the furnace chamber, such total amount of air being "split" into two streams, 60% into the bottom of the pellets column and 40% into the combustion chamber. In the stream of air passing through the combustion chamber there was burned a fuel oil (130,000 B. t. u.'s per gallon) in the amount of 3.66 gallons per 1 long ton of dry feed, to provide a heating gas which had a temperature of about 2300° F., measured at the aforesaid inlet ports to the furnace chamber. The air stream passing upwardly through the pellets column from bottom to top thereof was estimated to have a temperature of between 2100° and 2250° F. at the level of the inlet ports. The peak temperature attained within the interiors of the pellets was not measured, but was estimated as being at least 2450° F. The waste gases exited from the top of the pellets column at 350° F., and the indurated pellets exited from the bottom of the furnace chamber at 650° F. The total fuel consumption, per long ton of dry feed, was calculated to be 771,756 B. t. u.'s.

The indurated product, after passing out of the bottom of the furnace chamber, was screened at three-sixteenth inch, the material passing through this screen (in the form of dust and chips) being equivalent to 7% of the total discharged indurated material: these screenings were re-circulated into the system at the stage of mixing filter cake concentrate with the additives.

The interiors of the indurated pellets were examined and found to present a substantial extent of grain growth among particles of hematite, and a greater or lesser amount of glassy phase, establishing that components of the pellets had undergone substantial—but not complete—fusion.

While in the above the invention has been illustrated with use of 18.4 pounds (per long ton, dry feed) of anthracite fines, in varied repetitions of the above specific example, it has been found that the solid carbonaceous fuel content of the mixture from which the pellets are formed may be materially reduced. Thus, the process has been successfully practiced using as little as 10–12 pounds of the anthracite fines (or equivalent amount of other solid carbonaceous fuel). Provided the temperature of the heating gas is raised sufficiently to compensate, as little as 4–5 pounds of the solid carbonaceous fuel, per long ton dry feed basis, of the ore material, can be employed. However, the preferred lower limit of solid fuel content is 0.50%, i. e., about 10–12 pounds. Also it has been found that when the grade of the starting material—meaning, here, the ratio of pure iron oxide to gangue components—is lower than that recited in the above specific example, it may be necessary somewhat to increase the solid carbonaceous fuel content of the pellets. In this connection, it has been found that the process tolerates use of as much as 1.25% by weight of solid fuel in the pellets, although such large content tends somewhat to lower the density of the indurated pellets, and may significantly depress the "control" feature about to be described.

In the case of magnetite concentrate from magnetic taconites of the Lake Superior district, the amount of moisture in the "green" mixture may vary between the limits of 9.0 and 11.0%, depending largely on the relative size, and also on the size distribution, of the ore particles. Magnetites from other areas, due to differences in grain size, may have a moisture content, after filtering, varying between 5 and 25%. Likewise, the amount of bentonite used may be varied, depending upon the particular concentrate being processed, between 0.5 and 1.0% by weight. The content of soda ash (or equivalent dispersant for the bentonite) may be as little as 1.0 pound, or as much as 2.0 pounds, per long ton, dry feed.

The upper limit of the rate at which the furnace may be fed has not been ascertained with any degree of certainty, but the process has been successfully operated at feed rates of from 530 to 800 pounds per square foot per hour, and it is anticipated that the ultimate limit is not short of about 1400 or 1450 pounds per square foot per hour. In a furnace having a cross-sectional area of 84 square feet and operating with pellets having substantially the same density as described above, these rates of feed correspond to time intervals—in the dwell of a pellet in that portion of the column above the inlet ports of from 44 minutes to 46 minutes.

Under some circumstances it may be desirable to increase the ratio of total air blown to feed from the above-recited ratio of 0.85 to 1.0 to a 1 to 1 ratio or even higher; in some cases, the process has been operated at a 1.2 to 1 ratio. Also, the process has been found to be operable when from 70% to as little as 55% of the total "cold" (i. e., initially unheated) air was forced into the bottom portion of the pellets column with from 30% to as much as 45% of said total being introduced into the combustion chamber.

In repetitions of the above example it has been found that the combustion chamber temperature may be raised from the above-recited value to 2400° F. without damage to the process and, in fact, to its betterment. It appears that the tolerable upper limit of combustion chamber temperature is 2550° F., i. e., a temperature level somewhat higher than that at which lowest melting components of the pellets begin to be molten, yet without any substantial fusing-together of the pellets. For raising the temperature of the heating gas to the desired level, from about 2.5 to as much as 4.5 gallons of fuel oil (130,000 B. t. u.'s/gal.) have been used, the amount of fuel oil being determined not only by the maximum heating gas temperature desired but also by the relative volume of air used in providing the heating gas stream. It appears that to attain any significant amount of grain growth within the interiors of the pellets, the pellets must be held at grain growth temperaure—i. e., at a temperature of a least 2000° F. and between this approximate lower limit and 2550° F.—for, on the average, at least 30 minutes, and it is preferred that the interval of heating at grain growth temperature be as long as 60 minutes.

The advantages accruing from operating at such high combustion chamber temperatures are several.

(1) Considerably less coal in the pellets. This is reflected in diminishing the voids and in raising the density of the indurated product.

(2) Higher quality of product; product more uniform, and higher proportion of pellets reaches the furnaces intact; less dust and fines.

(3) Product completely oxidized to hematite and showing substantial grain growth among the particles of hematite.

(4) In spite of the increase in temperature, the operation is attended by a lower maintenance cost and by less "down" time.

(5) Increased yield of shippable product for same rate of feed.

Over and above these advantages, operating the combustion chamber at grain growth temperature, i. e., at or near the fusion temperature of the ore material, coupled with decrease in the solid fuel content of the pellets and with proper division of total air as between cooling and combustion, gives a remarkable improvement in the celerity with which the process may be controlled, insuring uniformity of induration of the whole charge. The temperature of the heating gas, and its relative volume, may be altered almost instantaneously, as desired, to maintain constant the extent of induration.

It is most surprising that a heating gas at as high a temperature as 2550° F. can be introduced into the gravitationally descending column of pellets without substantial fusing-together of the pellets directly contacted thereby. It may be that the phenomenon can be explained partly on the basis that detrimental actual fusion has a necessary time factor, and partly on the basis of the following facts. The iron ore concentrates, e. g., magnetite concentrates, with which the present invention is concerned, are not pure substances but rather are composed mostly of iron oxide with small contents of gangue particles of varying compositions. While it may be true that the lowest melting of these minor components has a fusion point as low as about 2200° F., by far the greater percentage of the material constituting the pellets does not begin to melt until heated to about 2550° F. To melt the entire pellet requires heating the same to some level between 2650° and 2700° F.

As was mentioned hereinbefore, the thoroughness of induration realizable by the carrying out of the improved process of the present invention is—at least in large part—a function of time of heating at grain growth temperature. In connection with the carrying out of this procedure, irregularity in the arrangement of the charge—which irregularity gives rise to localized differences in permeability of the pellets column—is not obviated; rather, it is accepted (as being inevitable) and is purposefully counteracted by insuring that the pellets are held, at grain growth temperature, for a very much longer time than heretofore.

I claim:
1. Process of indurating initially moist "green" pellets of finely divided magnetite concentrates containing homogeneously dispersed therethrough a solid carbonaceous fuel in an amount, within the range 0.5–1.25 percent by weight, based on the dry weight of the pellets, which is insufficient to contribute by its combustion the heat necessary to effect the desired induration, which comprises, causing the pellets as a column gravitationally to descend through a shaft-type indurating chamber, forcing a current of initially unheated cooling air to traverse said column countercurrently from bottom to top thereof, heating a current of initially unheated combustion air to a temperature in excess of 2300° F. but not above about 2550° F., introducing the current of heated air into the column of pellets at a level intermediate its bottom and its top, causing the current of heated air countercurrently to traverse the upper portion of the column of pellets, maintaining the volumn ratio of cooling air to combustion air within the range 7:3–11:9, the total air used being within the range 0.85–1.2 pounds per 1 pound of pellets, dry weight, and so adjusting the rate of descent of the column of pellets with respect to the height of said upper portion of the column which is traversed by said current of heated air that a pellet is resident in said upper portion for a time interval of at least 40 minutes and sufficient to effect susbtantial grain growth among iron oxide particles.

2. The process defined in claim 1, in which the solid carbonaceous fuel content of the "green" pellets is about 17 pounds per long ton dry weight of the pellets, the combustion chamber temperature is maintained at about 2400° F., the total air used amounts to about 0.85 pound per each 1 pound of pellets dry weight and is split 60–40 between cooling air and combustion air, and the time of residence of the pellets in that portion of the pellets column extending above said intermediate level is about 45 minutes.

References Cited in the file of this patent

UNITED STATES PATENTS

| | | |
|---|---|---|
| 2,676,095 | DeVaney et al. | Apr. 20, 1954 |
| 2,696,432 | Davis | Dec. 7, 1954 |
| 2,758,919 | DeVaney et al. | Aug. 14, 1956 |